United States Patent Office 2,847,277
Patented Aug. 12, 1958

2,847,277

PRECIPITATION OF URANIUM PEROXIDE OF LOW FLUORIDE CONTENT FROM SOLUTIONS CONTAINING FLUORIDES

Edward J. King and Herbert M. Clark, New Haven, Conn., assignors to the United States of America as represented by the United States Atomic Energy Commission No Drawing. Application June 27, 1945
Serial No. 601,948

12 Claims. (Cl. 23—14.5)

This invention relates to a process of precipitating peroxides from solutions containing soluble fluorides. More particularly, this invention relates to a process for the preparation of uranium peroxide of low fluoride content by precipitation of uranium peroxide from solutions containing fluorides.

In the preparation of metallic uranium by heating uranium tetrafluoride with magnesium, slags and dross are formed containing a substantial quantity of uranium compounds together with compounds of magnesium and fluorine. The process is usually carried out in a reaction chamber lined with lime and consequently compounds of calcium may also be present in the slags and dross. In the recovery of uranium from material of this character by the conversion of the uranium compounds to uranyl sulfate and the subsequent precipitation of uranium peroxide from the aqueous uranyl sulfate solution, as disclosed and claimed in the copending patent application of Louis Spiegler, Serial No. 559,665, filed October 20, 1944, now Patent No. 2,770,521, issued November 13, 1956, substantial quantities of compounds of magnesium and fluorine may be precipitated or carried with the uranium peroxide precipitate. As a consequence the uranium peroxide may be contaminated with fluorides in an amount from a few tenths of 1 percent to 2 or 3 percent depending upon original fluorine and magnesium contents of the uranyl sulfate solution. While the fluoride content may be reduced to an insignificant value by roasting the uranium-containing material with sulfuric acid to expel the fluorine as hydrogen fluoride, it is sometimes desirable to obtain a uranium compound free from substantial quantities of fluorine without employing a sulfuric acid roast. For example, in working up uranium-containing mixtures containing relatively small amounts of fluoride, the amount of by-product hydrogen fluoride which can be recovered may not be sufficient to offset the cost of recovery. For such materials a more economical process is desirable even though it may not provide for fluorine recovery.

Accordingly, one object of this invention is to provide a process for preparing uranium compositions of low fluoride content.

A further object of this invention is the provision of a process for the production of uranium peroxide of low fluoride content from uranium compositions containing compounds of magnesium and fluorine.

A further object of this invention is to provide a process for the precipitation of a peroxide under conditions to prevent the co-precipitation or carrying of compounds of fluorine with the peroxide precipitate.

A still further object of this invention is to provide a process for preparing uranium peroxide of sufficiently low fluoride content to make is unnecessary that the product be further treated to eliminate the residual fluoride.

Further and additional objects will appear from the following description and the appended claims.

In accordance with this invention it has been discovered that insoluble peroxides having a low fluoride content may be precipitated from solutions containing fluorides by carrying out the peroxide precipitation process in the presence of a soluble aluminum compound. It is believed that the aluminum ions serve to complex the fluoride ions present in the solution thereby tending to prevent the fluoride from being co-precipitated or carried down with the peroxide precipitate. In accordance with one embodiment of this invention a process of precipitating uranium peroxide from a uranyl salt solution containing fluoride ions is provided which comprises adding a soluble peroxide, such as hydrogen peroxide, and a soluble aluminum compound to said solution whereby the uranium peroxide is precipitated and whereby a substantial portion of the fluoride ions are complexed and are retained in the solution.

The process of this invention is particularly useful for preparing purified uranium compounds from residues containing compounds of uranium, calcium, magnesium and fluorine, and more particularly for preparing purified uranium compounds from slags and dross obtained as a by-product in the production of metallic uranium by heating uranium tetrafluoride with metallic magnesium. The residues may be solubilized in an acid and the uranium peroxide is precipitated from the resulting uranyl salt solution by the addition of a peroxide in accordance with any of the well known processes, one such being disclosed in the above-referred to Spiegler patent. In order to prevent the carrying of substantial amounts of fluoride ions into the peroxide precipitate, the solution is treated with a soluble compound of aluminum prior to the peroxide precipitation. Presumably the aluminum ions form a complex ($AlF_6^{---}$) with the fluoride ions. This complex does not tend to precipitate with the uranium peroxide. The peroxide preferably is precipitated from a solution of uranyl sulfate at between about pH 2 and 4, and the aluminum ions are preferably added to the solution as aluminum sulfate. In general, sufficient aluminum ion should be added to the solution in order to complex all of the fluoride as $AlF_6^{---}$. However, it has been found desirable, for optimum results, to add the aluminum ion in more than about three-fold excess of the amount to complex the fluoride as $AlF_6^{---}$.

The peroxide precipitation may be effected by any desirable means, for example, it may conveniently be carried out by the addition of hydrogen peroxide to an aqueous solution of uranyl sulfate, preferably at between about pH 2 and 4. However, for optimum results the peroxide precipitation in the presence of the aluminum ion is carried out at between about pH 3.0 and 3.5. In general, reactions above about pH 4.0 should be avoided since the aluminum may have a tendency to precipitate as the hydroxide.

If desired, and in accordance with a further embodiment of this invention, a uranyl salt solution having a high fluoride content may be subjected to a pre-treatment with calcium hydroxide to precipitate a major portion of the fluoride as calcium fluoride. The calcium fluoride is separated from the solution and the solution is then treated with a peroxide and a soluble aluminum compound to precipitate uranium peroxide having a low fluoride content.

For a more complete understanding of this invention reference will now be made to certain specific experiments which show the advantages of the process of this invention and indicate the manner in which this invention may be carried out.

EXPERIMENT I

A solution was prepared which was 2.5 molar in magnesium sulfate, 0.13 molar in uranyl sulfate, 2 molar in sulfuric acid, and 0.13 molar in sodium fluoride. This was heated to 50° C. and 1.5 equivalents of calcium hydroxide were added for each liter of solution. The acidity was then adjusted to pH 3.5 with 20% sodium hydroxide solution. One-half of this mixture was filtered immediately for Experiment I-A, while the remainder was kept at 50° C. for 24 hours and then filtered for Experiment I-B. The fluoride contents of filtrates A and B were, respectively, 0.162 and 0.157 gram of fluorine per 100 ml. After standing for 10 hours at 50° C., samples of both filtrates were refiltered and analyzed. Both samples showed a 6.7% decrease in fluoride content. This may be attributed in part to slow precipitation of insoluble fluorides during the standing, and in part to attack of the glass vessels by the fluorides.

From other portions of filtrates A and B uranium peroxide was precipitated at a pH between 3.0 and 3.5 in the presence of ammonium sulfate by the addition of hydrogen peroxide. Part of the precipitate was filtered off immediately and the remainder was allowed to stand for 10 hours at room temperature before filtering. The precipitates which were filtered off immediately contained 0.82% and 0.42% fluorine for Experiments I-A and I-B, respectively, whereas those which were filtered after standing contained 1.93% and 0.61% fluorine, respectively. In the course of several hours or a day, white precipitates developed in all of the filtrates from the peroxide precipitates.

No aluminum salts were employed in the precipitations described in this experiment and it will be noted that the peroxide precipitates, in all cases, contain a substantial quantity of fluorides. It is seen in this experiment that the peroxide precipitate tends to take up fluoride from the supernatant liquid containing no aluminum ions upon standing, and that somewhat improved results are obtained when the insoluble fluorides of calcium and magnesium are given time to come out of solution before precipitation of the peroxide.

EXPERIMENT II

Uranium peroxide was precipitated from 125 ml. portions of a solution which was 2.0 molar in magnesium sulfate, 0.10 molar in uranyl sulfate, and 0.762 molar in sodium fluoride. Each portion (except II-F) also contained 10 grams of ammonium sulfate and varying amounts of aluminum sulfate. The results are given in Table I. The term "stoichiometric aluminum" means that quantity of aluminum ion or aluminum sulfate necessary to complex the fluoride present as $AlF_6^{---}$.

Table I

| Expt. No. | Description | Percent F in ppt. |
|---|---|---|
| II-A | No aluminum | 0.98 |
| II-B | Stoichiometric aluminum | .60 |
| II-C | 2x stoichiometric aluminum | .23 |
| II-D | 3x stoichiometric aluminum | .08 |
| II-E | 6x stoichiometric aluminum | .06 |
| II-F | 3x stoichiometric aluminum and only 3 grams of ammonium sulfate. | .10 |

White precipitates developed in the filtrates from the peroxide precipitations of II-A, B and C. No precipitates were obtained in the filtrates of II-D, E, and F. This illustrates the effectiveness of excess aluminum in keeping fluoride in solution.

The peroxide precipitated in the presence of three times stoichiometric aluminum was analyzed for aluminum. Various macro and semi-micro methods gave negative results. An alizarin spot test appeared to show the presence of several hundredths of a percent probably associated with the fluoride in the precipitate.

The results of this experiment indicates that optimum results are obtained when the quantity of aluminum ion added is more than about three times the stoichiometric amount necessary to complex the fluoride present as $AlF_6^{---}$.

EXPERIMENT III

This experiment was similar to Experiment II, but the peroxides stood for 10 hours before filtering. When no aluminum was present the peroxide precipitate contained 0.90% fluorine, but in the presence of three times the stoichiometric amount of aluminum the percentage was 0.12. This experiment illustrates that the peroxide precipitate remains low in fluoride content even though allowed to remain in contact with the supernatant liquid for a substantial period of time.

EXPERIMENTS IV AND V

In order to determine the influence of the presence of calcium on the effectiveness of aluminum, Experiment I was repeated in a modified form. The preparation of the initial solution of magnesium sulfate, uranyl sulfate, sulfuric acid, and sodium fluoride, and the addition of calcium hydroxide followed the procedure described for Experiment I. One portion of the mixture was filtered for Experiment IV; the remainder was kept at 50° C. for 14 hours and then filtered for Experiment V.

The filtrates were analyzed and found to contain 0.151 and 0.153 gram of fluorine per 100 ml. for IV and V respectively. On the basis of these analyses aluminum sulfate was added to 200 ml. aliquots of the filtrates to give the desired aluminum to fluorine ratios. A white precipitate gradually formed in the filtrate of Experiment IV before the addition of the aluminum sulfate. This was filtered off before proceeding. Six grams of ammonium sulfate were added to each solution, and uranium peroxide was precipitated as usual. The results are summarized in Table II.

Table II

| Expt. No. | Mole ratio Al:F | Remarks | Percent F in ppt. |
|---|---|---|---|
| IV-A | 1:6 | Ppt. filtered off immediately | 0.41 |
| IV-B | 1:6 | Ppt. filtered off after 10 hrs | 2.32 |
| IV-C | 3:6 | Ppt. filtered off immediately | 0.062 |
| V-A | 3:6 | do | 0.056 |
| V-B | 3:6 | Ppt. filtered off after 10 hrs | 0.056 |

The high result of IV-B can probably be attributed to post-precipitation of calcium fluoride. It is seen that the presence of calcium may aid in reducing the amount of fluoride in the precipitates.

It will be seen from the foregoing experiments that the fluoride content of uranium peroxide precipitates can be reduced to less than about 0.1 of one percent by precipitation of the peroxide in the presence of at least about three-fold excess of aluminum ion, based on the amount of aluminum necessary to complex the fluoride in the solution as $AlF_6^{---}$. In the foregoing description the use of aluminum sulfate is specifically indicated. However, it will be readily aparent that other soluble compounds of aluminum may be employed without departing from the spirit and scope of this invention. For example, aluminum nitrate, aluminum chloride, or other readily available soluble inorganic aluminum compounds capable of complexing the fluoride may be employed.

It will be apparent from the foregoing that a method has been provided for precipitating peroxides of low fluoride content from uranyl salt solutions containing dissolved fluorides. The invention may be utilized in a number of processes for the separation of compounds of uranium and fluorides. In the recovery of uranium from a residue containing fluorides, the residue is treated to dissolve the uranium under non-reducing conditions to form a soluble uranyl salt. Soluble fluorides may be present in the solution and they may be nearly completely separated from the uranium by the precipitation of uranium peroxide in the presence of an aluminum salt as hereinbefore set forth.

This invention has been described with particular reference to the precipitation of uranium peroxides. The invention is also applicable to the precipitation of other insoluble peroxides from solutions containing fluorides wherein it is desired that the fluoride content of the peroxide precipitate have a low value.

While several particular embodiments of this invention are shown above, it will be understood, of course, that the invention is not to be limited thereto since many modifications may be made and it is contemplated, therefore, to cover any such modifications as fall within the true spirit and scope of the appended claims.

We claim:

1. In the recovery of uranium peroxide by precipitation from a uranyl salt solution containing fluoride ions, the improvement which comprises effecting the uranium peroxide precipitation in the presence of aluminum ions.

2. In the recovery of uranium peroxide by precipitation from a uranyl sulfate solution containing fluoride ions, the improvement which comprises effecting the uranium peroxide precipitation in the presence of dissolved aluminum sulfate.

3. The process recited in claim 2 wherein the amount of aluminum sulfate in the solution is in more than about three-fold excess of the amount required to complex the fluoride present as $AlF_6^{---}$.

4. The process recited in claim 2 wherein the peroxide precipitation is carried out at between about pH 2 and 4.

5. A process of precipitating uranium peroxide from a uranyl salt solution containing fluoride ions which comprises adding a soluble peroxide and a soluble aluminum compound to said solution whereby the uranium peroxide is precipitated and whereby a substantial portion of the fluoride ions are complexed and are retained in the solution.

6. A process of precipitating uranium peroxide from an aqueous solution of uranyl sulfate containing fluoride ions which comprises treating the solution with hydrogen peroxide and aluminum sulfate whereby to precipitate uranium peroxide and whereby a substantial amount of the fluoride ions are complexed with aluminum and are retained in solution.

7. The process recited in claim 6 wherein the peroxide precipitation is carried out at between about pH 2 and 4.

8. The process recited in claim 6 wherein the peroxide precipitate is carried out at between about pH 3.0 and 3.5.

9. The process recited in claim 6 wherein the aluminum sulfate added is in more than about three-fold excess of the amount required to complex the fluoride present as $AlF_6^{---}$.

10. A process of recovering uranium of low fluoride content from an aqueous solution of a uranyl salt containing fluoride ions which comprises separating a portion of said fluoride ions by a preliminary precipitation as the insoluble calcium fluoride salt and thereafter adding a soluble peroxide and a soluble aluminum compound to said solution whereby the uranium peroxide is precipitated and whereby a substantial proportion of the fluoride ions remaining in the solution are complexed and retained in the solution during the peroxide precipitation step.

11. The process recited in claim 10 wherein said aluminum compound is aluminum sulfate.

12. In a process for the precipitation of an insoluble peroxide from a solution containing fluorides, the step of treating said solution with a soluble aluminum compound to complex said fluorides.

No references cited.